United States Patent
Tsai et al.

(10) Patent No.: US 12,477,355 B2
(45) Date of Patent: Nov. 18, 2025

(54) METHOD AND APPARATUS FOR BEAM GROUP REPORTING IN MOBILE COMMUNICATIONS

(71) Applicant: MEDIATEK INC., Hsin-Chu (TW)

(72) Inventors: Cheng-Rung Tsai, Hsin-Chu (TW); Yi-Ru Chen, Hsin-Chu (TW)

(73) Assignee: MediaTek Inc., Hsinchu (TW)

( * ) Notice: Subject to any disclaimer, the term of this patent is extended or adjusted under 35 U.S.C. 154(b) by 481 days.

(21) Appl. No.: 17/966,636

(22) Filed: Oct. 14, 2022

(65) Prior Publication Data
US 2023/0156486 A1   May 18, 2023

Related U.S. Application Data

(60) Provisional application No. 63/279,208, filed on Nov. 15, 2021.

(51) Int. Cl.
*H04W 16/28* (2009.01)
*H04L 5/00* (2006.01)
*H04W 24/10* (2009.01)

(52) U.S. Cl.
CPC ........... *H04W 16/28* (2013.01); *H04L 5/0051* (2013.01); *H04W 24/10* (2013.01)

(58) Field of Classification Search
CPC ...... H04W 16/28; H04W 24/10; H04L 5/0051
See application file for complete search history.

(56) References Cited

U.S. PATENT DOCUMENTS

| | | | |
|---|---|---|---|
| 2018/0227094 A1* | 8/2018 | Liu | H04L 5/0025 |
| 2019/0068263 A1* | 2/2019 | Yu | H04B 7/046 |
| 2019/0379506 A1* | 12/2019 | Cheng | H04B 7/022 |
| 2020/0053607 A1* | 2/2020 | Ingale | H04W 36/304 |
| 2020/0404638 A1* | 12/2020 | Deogun | H04B 7/0617 |
| 2021/0111843 A1* | 4/2021 | Zhang | H04L 25/0224 |
| 2021/0211176 A1* | 7/2021 | Gao | H04B 17/318 |
| 2021/0306895 A1* | 9/2021 | Chen | G01S 5/0236 |
| 2021/0352503 A1* | 11/2021 | Zhou | H04W 16/28 |

(Continued)

FOREIGN PATENT DOCUMENTS

| | | | |
|---|---|---|---|
| WO | WO 2021/208958 A1 | 4/2020 | |
| WO | WO 2020/092468 A1 | 5/2020 | |

OTHER PUBLICATIONS

Europe IPO, search report for the European patent application 22205510.5, dated Mar. 15, 2023 (9 pages).

(Continued)

*Primary Examiner* — Fahmida S Chowdhury
(74) *Attorney, Agent, or Firm* — Helen Mao; Zheng Jin; Imperium Patent Works

(57) ABSTRACT

A beam group reporting method is proposed. The network node may allocate a report configuration for the UE and transmit the allocated report configuration to the UE. The UE may perform the measurement based on the report configuration from the network node and determine at least one beam group based on a resource set associated with the report configuration and the measurement result. Each beam group may comprise two reference-signal (RS) resources respectively associating with different physical cell indexes (PCIs). Then, the UE may report a report comprising at least one beam group to the network node.

18 Claims, 3 Drawing Sheets

(56) References Cited

U.S. PATENT DOCUMENTS

| | | | | |
|---|---|---|---|---|
| 2022/0140878 A1* | 5/2022 | Zhu | ............... | H04B 7/0404 370/252 |
| 2023/0078059 A1* | 3/2023 | Zhang | ............... | H04W 36/0085 370/331 |
| 2023/0115082 A1* | 4/2023 | Khoshnevisan | ...... | H04L 5/0094 370/329 |
| 2023/0156486 A1* | 5/2023 | Tsai | ............... | H04B 7/024 370/329 |
| 2023/0216565 A1* | 7/2023 | Kwak | ............... | H04B 7/088 375/267 |
| 2023/0254712 A1* | 8/2023 | Li | ............... | H04B 7/06964 370/216 |
| 2024/0224094 A1* | 7/2024 | Li | ............... | H04B 17/328 |
| 2025/0016868 A1* | 1/2025 | Matsumura | ......... | H04B 7/0695 |

OTHER PUBLICATIONS

R1-2107081, Futurewei: "Beam management for simultaneous multi-TRP transmission with multi-panel reception", 3GPP Draft, vol. RAN WG1, No. e-Meeting; Aug. 16, 2021-Aug. 27, 2021, Aug. 6, 2021.

Taiwan IPO, search report and written opinion for application 111143341 mailed Apr. 28, 2023 (6 pages).

\* cited by examiner

METHOD AND APPARATUS FOR BEAM GROUP REPORTING IN MOBILE COMMUNICATIONS

CROSS REFERENCE TO RELATED APPLICATIONS

This application claims priority under 35 U.S.C. § 119 from U.S. Provisional Application No. 63/279,208, entitled "Beam group reporting configuration and format", filed on Nov. 15, 2021, the subject matter of which is incorporated herein by reference.

TECHNICAL FIELD

The disclosed embodiments relate generally to wireless communication, and, more particularly, to beam group reporting with respect to user equipment and network node in mobile communications.

BACKGROUND

The wireless communications network has grown exponentially over the years. A long-term evolution (LTE) system offers high peak data rates, low latency, improved system capacity, and low operating cost resulting from simplified network architecture. LTE systems, also known as the 4G system, also provide seamless integration to older wireless network, such as GSM, CDMA and universal mobile telecommunication system (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The next generation mobile network (NGMN) board, has decided to focus the future NGMN activities on defining the end-to-end requirements for 5G new radio (NR) systems.

In conventional technology, for beam group reporting, the UE cannot differentiate reference signal (RS) resources transmitted from different transmission and reception points (TRPs). Therefore, the RS resources in the same reported group may come from the same TRP. When the RS resources in the same reported group come from the same TRP, the RS resources will not be used for simultaneous transmission and reception.

SUMMARY

A beam group reporting method is proposed. The network node may allocate a report configuration for the UE and transmit the allocated report configuration to the UE. The UE may perform the measurement based on the report configuration from the network node and determine at least one beam group based on a resource set associated with the report configuration and the measurement result. Each beam group may comprise two reference-signal (RS) resources respectively associating with different physical cell indexes (PCIs). Then, the UE may transmit a report comprising at least one beam group to the network node. Therefore, in the application, the UE can know that RS resources are transmitted from which TRP. The RS resources in the same reported group will not come from the same TRP.

In one embodiment, the UE may receive a report configuration from a network node, wherein the report configuration is associated with a resource set. The UE may determine at least one beam group based on the resource set, wherein each beam group comprises two reference-signal (RS) resources respectively associating with a first physical cell index (PCI) and a second PCI. In addition, the UE may transmit a report comprising the at least one beam group to the network node.

In another embodiment, the network node may transmit a report configuration to a user equipment (UE), wherein the report configuration is associated with a resource set. The network node may receive a report comprising at least one beam group from the UE, wherein each beam group comprises two reference-signal (RS) resources respectively associating with a first physical cell index (PCI) and a second PCI.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
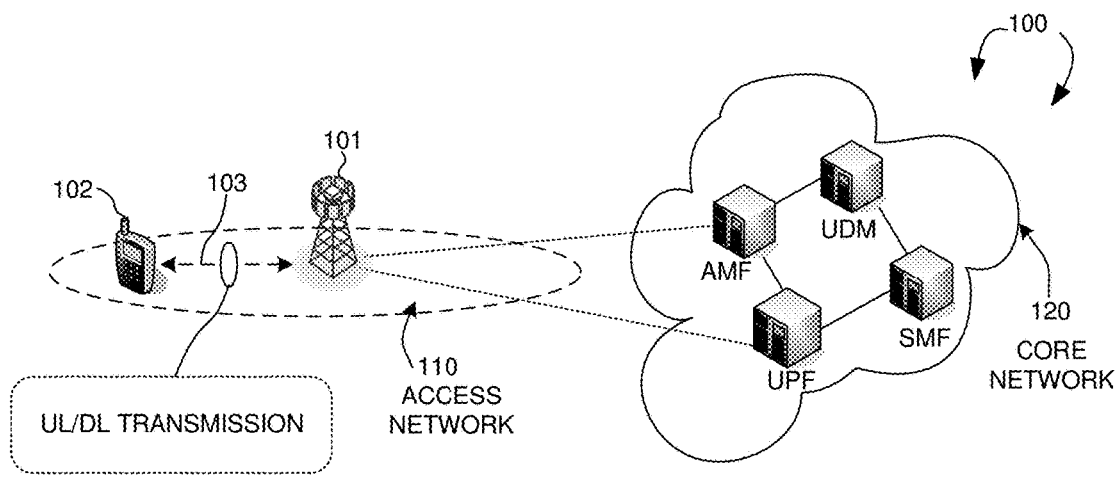
FIG. 1 illustrates an exemplary 5G new radio (NR) network 100 in accordance with aspects of the current invention.

FIG. 1 illustrates an exemplary 5G new radio (NR) network 100 in accordance with aspects of the current invention. The 5G NR network 100 comprises a network node 101 communicatively connected to a user equipment (UE) 102 operating in a licensed band (e.g., 30 GHz-300 GHz for mmWave) of an access network 110 which provides radio access using a Radio Access Technology (RAT) (e.g., the 5G NR technology). The access network 110 is connected to a 5G core network 120 by means of the NG interface, more specifically to a User Plane Function (UPF) by means of the NG user-plane part (NG-u), and to a Mobility Management Function (AMF) by means of the NG control-plane part (NG-c). One gNB can be connected to multiple UPFs/AMFs for the purpose of load sharing and redundancy. The network node 101 may be a base station (BS) or a gNB. The UE 102 may be a smart phone, a wearable device, an Internet of Things (IoT) device, and a tablet, etc. Alternatively, UE 102 may be a Notebook (NB) or Personal Computer (PC) inserted or installed with a data card which includes a modem and RF transceiver(s) to provide the functionality of wireless communication.

The network node 101 may provide communication coverage for a geographic coverage area in which communications with the UE 102 is supported via a communication link 103. The communication link 103 between the network node 101 and the UE 102 may utilize one or more frequency carriers to form one or more cells (e.g., a PCell and one or more SCells). The communication link 103 shown in the 5G NR network 100 may include uplink transmissions from the UE 102 to the network node 101 (e.g., on the Physical Uplink Control Channel (PUCCH) or Physical Uplink Shared Channel (PUSCH)) or downlink transmissions from the network node 101 to the UE 102 (e.g., on the Physical Downlink Control Channel (PDCCH) or Physical Downlink Shared Channel (PDCCH)).

In accordance with one novel aspect, the UE 102 may receive a report configuration from the network node 101. The report configuration may be associated with a resource set. In an example, the UE 102 may receive the report configuration from the network node 101 through a higher layer signaling, e.g., radio resource control (RRC) layer signaling.

In accordance with one novel aspect, the resource set may comprise a set of reference-signal (RS) resources and a set of physical cell indexes (PCIs). Each PCI is one-to-one mapped to each RS resource. For example, if a resource set comprises a set of RS resources {RS #1, RS #2, RS #3, RS #4, RS #5, RS #6} and a set of PCIs {PCI #1, PCI #1, PCI #1, PCI #2, PCI #2, PCI #2}, the RS resource RS #1 will be mapped to PCI #1, RS #2 will be mapped to PCI #1, RS #3 will be mapped to PCI #1, RS #4 will be mapped to PCI #2, RS #5 will be mapped to PCI #2 and RS #6 will be mapped to PCI #2.

In accordance with one novel aspect, the resource set may be associated with a group-based layer 1 (L1)-Reference Signal Receiving Power (RSRP) report or a L1-Signal to Interference plus Noise Ratio (SINR) report.

In accordance with one novel aspect, the UE 102 may determine at least one beam group based on the resource set associated with the report configuration from the network node 101. In each beam group, there are two RS resources and the two RS resources are respectively associated with a first PCI and a second PCI. That is to say, the RS resources in the same beam group are respectively corresponded to different PCIs. After the UE 102 determines at least one beam group based on the resource set associated with the report configuration from the network node 101, the UE 102 may transmit a report comprising the at least one beam group to the network node 101. For example, if a resource set comprises a set of RS resources {RS #1, RS #2, RS #3, RS #4, RS #5, RS #6} and a set of PCIs {PCI #1, PCI #1, PCI #1, PCI #2, PCI #2, PCI #2}, the UE 102 may report {RS #1, RS #4} as a beam group, report {RS #1, RS #5} as a beam group, report {RS #1, RS #6} as a beam group, report {RS #2, RS #4} as a beam group, report {RS #2, RS #5} as a beam group, report {RS #2, RS #6} as a beam group, report {RS #3, RS #4} as a beam group, report {RS #3, RS #5} as a beam group, or report {RS #3, RS #6} as a beam group. The PCI #1 may be associated with a transmission and reception point (TRP) and the PCI #2 may be associated with another TRP.

In accordance with one novel aspect, the UE 102 may comprise a capability of receiving the RS resources in the same beam group simultaneously. That is to say, in the application, because the RS resources in the same beam group do not come from the same TRP, the RS resources in the same beam group are able to be used for simultaneous transmission and reception.

Figure 2:
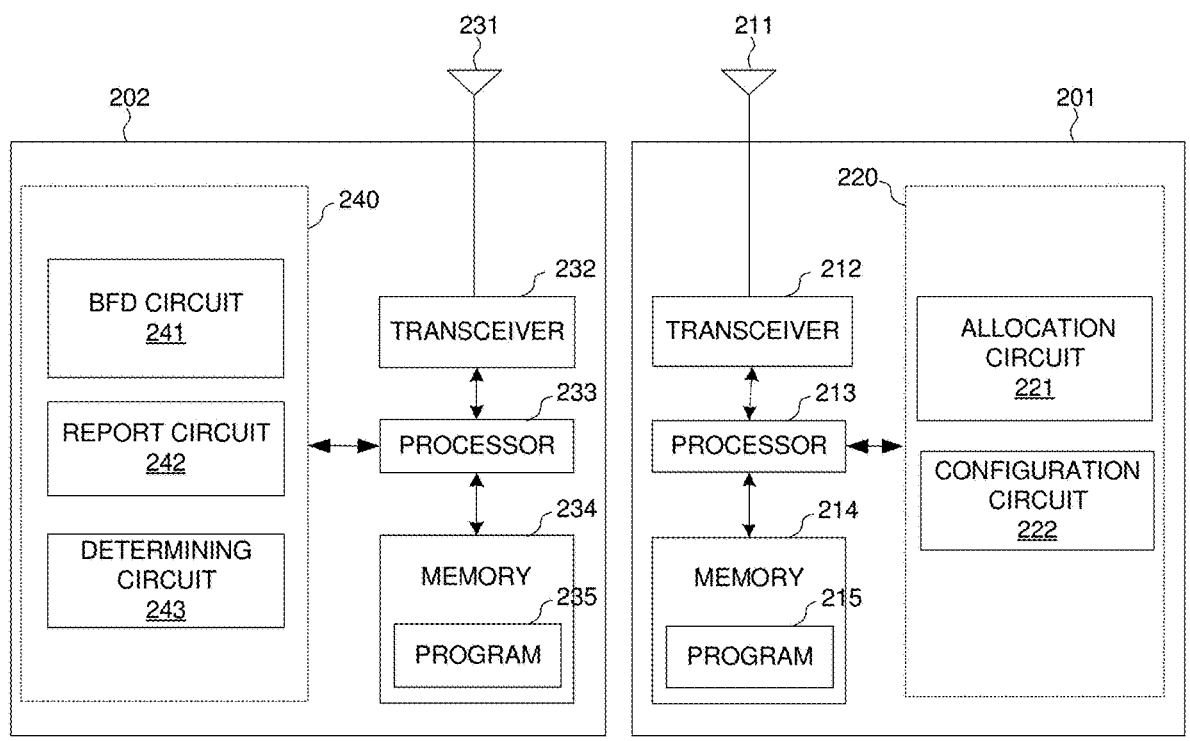
FIG. 2 is a simplified block diagram of a network node and a user equipment that carry out certain embodiments of the present invention.

FIG. 2 is a simplified block diagram of a network node and a user equipment (UE) that carry out certain embodiments of the present invention. The network node 201 may be a base station (BS) or a gNB, but the present invention should not be limited thereto. The UE 202 may be a smart phone, a wearable device, an Internet of Things (IoT) device, and a tablet, etc. Alternatively, UE 202 may be a Notebook (NB) or Personal Computer (PC) inserted or installed with a data card which includes a modem and RF transceiver(s) to provide the functionality of wireless communication.

Network node 201 has an antenna array 211 having multiple antenna elements that transmits and receives radio signals, one or more RF transceiver modules 212, coupled with the antenna array 211, receives RF signals from antenna array 211, converts them to baseband signal, and sends them to processor 213. RF transceiver 212 also converts received baseband signals from processor 213, converts them to RF signals, and sends out to antenna array 211. Processor 213 processes the received baseband signals and invokes different functional modules 220 to perform features in network node 201. Memory 214 stores program instructions and data 215 to control the operations of network node 201. Network node 201 also includes multiple function modules that carry out different tasks in accordance with embodiments of the current invention.

Similarly, UE 202 has an antenna array 231, which transmits and receives radio signals. A RF transceiver 232, coupled with the antenna, receives RF signals from antenna array 231, converts them to baseband signals and sends them to processor 233. RF transceiver 232 also converts received baseband signals from processor 233, converts them to RF signals, and sends out to antenna array 231. Processor 233 processes the received baseband signals and invokes different functional modules 240 to perform features in UE 202. Memory 234 stores program instructions and data 235 to control the operations of UE 202. UE 202 also includes multiple function modules and circuits that carry out different tasks in accordance with embodiments of the current invention.

The functional modules and circuits 220 and 240 can be implemented and configured by hardware, firmware, software, and any combination thereof. The function modules and circuits 220 and 240, when executed by the processors 213 and 233 (e.g., via executing program codes 215 and 235), allow network node 201 and UE 202 to perform embodiments of the present invention.

In the example of FIG. 2, the network node 201 may comprise a resource allocation circuit 221 and a report circuit 222. Resource allocation circuit 221 may allocate a report configuration for the UE 202. Report circuit 222 may report the allocated report configuration to the UE 202.

In the example of FIG. 2, the UE 202 may comprise a measurement circuit 241, a determination circuit 242 and a report circuit 243. Measurement circuit 241 may perform the measurement based on the report configuration from the network node 201. Determination circuit 242 may determine at least one beam group based on a resource set associated with the report configuration and the measurement result of the measurement circuit 241. Report circuit 243 may report a report comprising at least one beam group to the network node 201.

Figure 3:
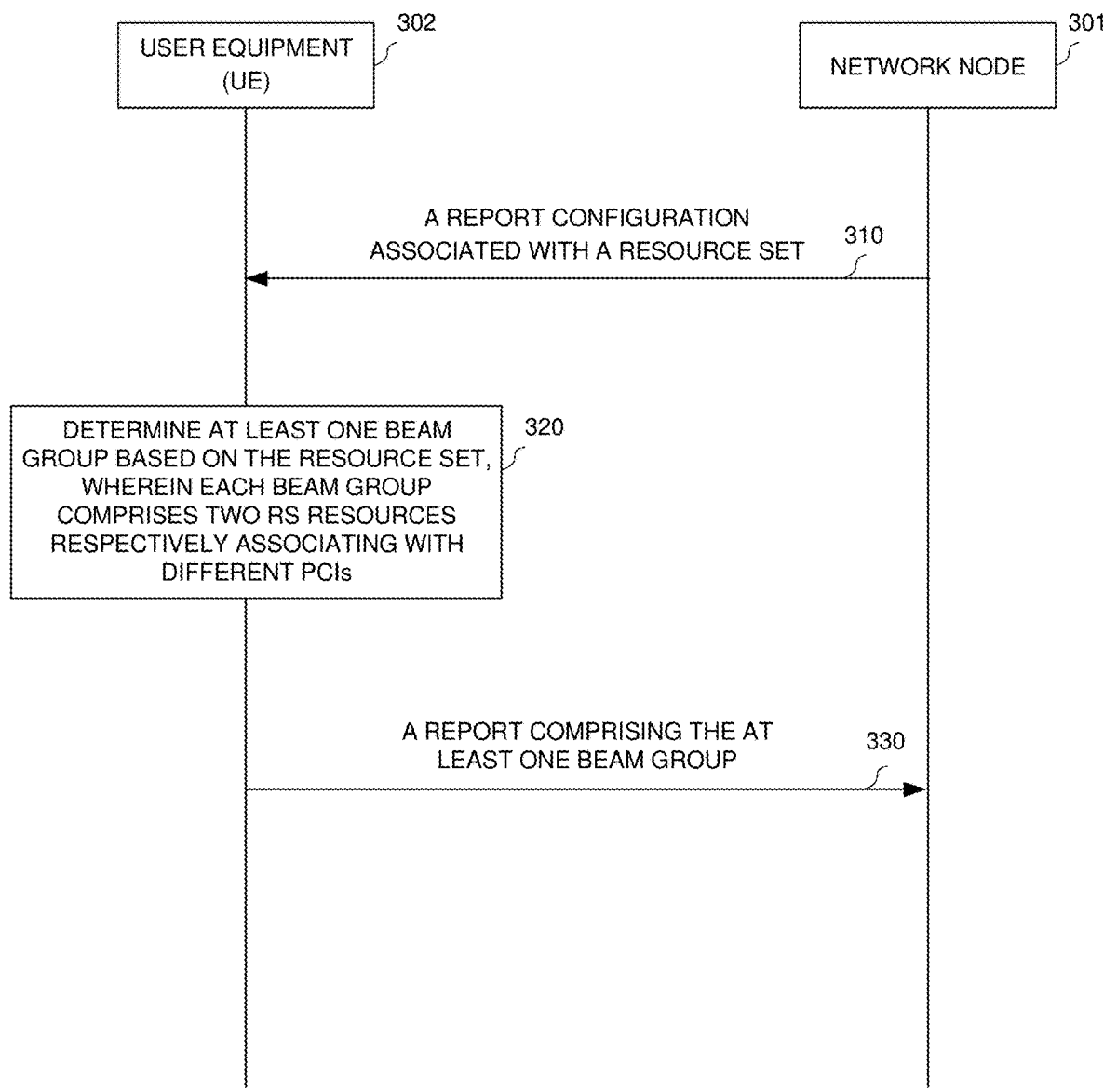
FIG. 3 illustrates a procedure for beam group reporting in accordance with one novel aspect.

FIG. 3 illustrates a procedure for beam group reporting in accordance with one novel aspect. In step 310, the network node 301 transmits a report configuration to the UE 302.

In step 320, the UE 302 determines at least one beam group based on the resource set. Each beam group may comprise two reference-signal (RS) resources respectively associating with different physical cell indexes (PCIs).

In step 330, the UE 302 transmits a report comprising the at least one beam group to the network node 301.

Figure 4:
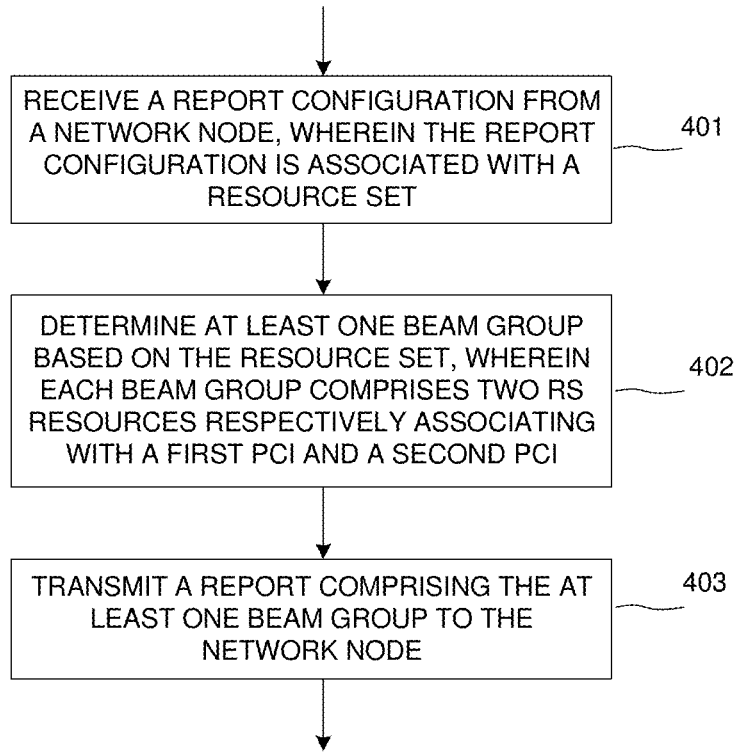
FIG. 4 is a flow chart of a beam group reporting method in accordance with one novel aspect.

FIG. 4 is a flow chart of a beam group reporting method in accordance with one novel aspect. In step 401, the UE 102 receives a report configuration from a network node, wherein the report configuration is associated with a resource set.

In step 402, the UE 102 determines at least one beam group based on the resource set, wherein each beam group comprises two reference-signal (RS) resources respectively associating with a first physical cell index (PCI) and a second PCI. In accordance with one novel aspect, the resource set comprises the first PCI and the second PCI.

In step 403, the UE 102 transmits a report comprising the at least one beam group to the network node.

Figure 5:
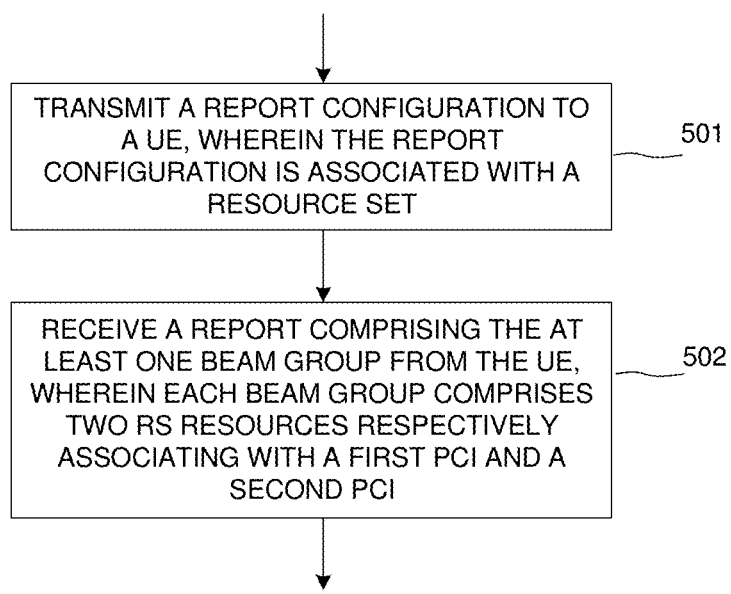
FIG. 5 is a flow chart of a beam group reporting method in accordance with another novel aspect

FIG. 5 is a flow chart of a beam group reporting method in accordance with another novel aspect. In step 501, the network node 101 transmits a report configuration to the UE 102, wherein the report configuration is associated with a resource set. In accordance with one novel aspect, the resource set may comprise a set of reference-signal (RS) resources and a set of physical cell indexes (PCIs). Each PCI is one-to-one mapped to each RS resource.

In step 502, the network node 101 receives a report comprising at least one beam group from the UE 102, wherein each beam group comprises two reference-signal (RS) resources respectively associating with a first physical cell index (PCI) and a second PCI. In accordance with one novel aspect, the resource set comprises the first PCI and the second PCI.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   receiving, by a user equipment (UE), a report configuration from a network node, wherein the report configuration is associated with a resource set;
   determining, by the UE, at least one beam group based on the resource set, wherein each beam group comprises two reference-signal (RS) resources respectively associating with a first physical cell index (PCI) and a second PCI; and
   transmitting, by the UE, a report comprising the at least one beam group to the network node.

2. The method of claim 1, wherein the UE comprises a capability of receiving the RS resources in the same beam group simultaneously.

3. The method of claim 1, wherein the resource set comprises a set of RS resources and a set of PCIs, and each PCI is one-to-one mapped to each RS resource.

4. The method of claim 3, wherein the set of PCIs comprises at least the first PCI and the second PCI.

5. The method of claim 1, wherein the resource set is associated with a group-based layer 1 (L1)-Reference Signal Receiving Power (RSRP) report or a L1-Signal to Interference plus Noise Ratio (SINR) report.

6. The method of claim 1, wherein the report configuration is received by the UE through a higher layer signaling.

7. A user equipment (UE), comprising:
   a receiver, receiving a report configuration from a network node, wherein the report configuration is associated with a resource set;
   a processor, determining at least one beam group based on the resource set, wherein each beam group comprises two reference-signal (RS) resources respectively associating with a first physical cell index (PCI) and a second PCI; and
   a transmitter, transmitting a report comprising the at least one beam group to the network node.

8. The UE of claim 7, wherein the receiver comprises a capability of receiving the RS resources in the same beam group simultaneously.

9. The UE of claim 7, wherein the resource set comprises a set of RS resources and a set of PCIs, and each PCI is one-to-one mapped to each RS resource.

10. The UE of claim 9, wherein the set of PCIs comprises at least the first PCI and the second PCI.

11. The UE of claim 7, wherein the resource set is associated with a group-based layer 1 (L1)-Reference Signal Receiving Power (RSRP) report or a L1-Signal to Interference plus Noise Ratio (SINR) report.

12. The UE of claim 7, wherein the receiver receives the report configuration through a higher layer signaling.

13. A method, comprising:
   transmitting, by a network node, a report configuration to a user equipment (UE), wherein the report configuration is associated with a resource set; and
   receiving, by the network node, a report comprising at least one beam group from the UE, wherein each beam group comprises two reference-signal (RS) resources respectively associating with a first physical cell index (PCI) and a second PCI.

14. The method of claim 13, wherein the network node comprises a capability of transmitting the RS resources in the same beam group simultaneously.

15. The method of claim 13, wherein the resource set comprises a set of RS resources and a set of PCIs, and each PCI is one-to-one mapped to each RS resource.

16. The method of claim 15, wherein the set of PCIs comprises at least the first PCI and the second PCI.

17. The method of claim 13, wherein the resource set is associated with a group-based layer 1 (L1)-Reference Signal Receiving Power (RSRP) report or a L1-Signal to Interference plus Noise Ratio (SINR) report.

18. The method of claim 13, wherein the report configuration is transmitted by the network node through a higher layer signaling.

* * * * *